United States Patent
Yang et al.

(10) Patent No.: US 12,487,459 B2
(45) Date of Patent: Dec. 2, 2025

(54) DISPLAY DEVICE

(71) Applicant: WUHAN CHINA STAR OPTOELECTRONICS TECHNOLOGY CO., LTD., Hubei (CN)

(72) Inventors: Huanli Yang, Hubei (CN); Rui He, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 497 days.

(21) Appl. No.: 18/050,954

(22) Filed: Oct. 28, 2022

(65) Prior Publication Data
US 2024/0111159 A1    Apr. 4, 2024

(30) Foreign Application Priority Data
Sep. 29, 2022    (CN) .......................... 202211199183.5

(51) Int. Cl.
*G02B 27/01* (2006.01)
*G02B 27/12* (2006.01)
*G02B 27/28* (2006.01)

(52) U.S. Cl.
CPC ....... *G02B 27/0172* (2013.01); *G02B 27/123* (2013.01); *G02B 27/283* (2013.01)

(58) Field of Classification Search
CPC ............. G02B 27/0172; G02B 27/123; G02B 27/283; G02B 27/286
See application file for complete search history.

(56) References Cited

FOREIGN PATENT DOCUMENTS

CN    114911063 A  *  8/2022  ......... G02B 27/0101

OTHER PUBLICATIONS

CN 114911063 A machine translation (Year: 2022).*

* cited by examiner

*Primary Examiner* — James A Dudek
(74) *Attorney, Agent, or Firm* — PV IP PC; Wei Te Chung

(57) ABSTRACT

A display device is provided, including a display screen; a first polarizer arranged on a light-emitting surface of the display screen; a light splitting sheet arranged on a side of the first polarizer away from the display screen, wherein a direction of a light transmission axis of the light splitting sheet is consistent with a direction of a light transmission axis of the first polarizer; a first quarter-wave plate arranged on a side of the light splitting sheet away from the first polarizer; a first lens arranged on a side of the first quarter-wave plate away from the light splitting sheet; and a transflective film arranged on a side of the first lens away from the first quarter-wave plate.

17 Claims, 4 Drawing Sheets

DISPLAY DEVICE

FIELD OF INVENTION

The invention relates to the field of display technology, and particularly to a display device.

BACKGROUND

Virtual reality (VR) technology is a way of enlarging and projecting virtual scenes, which can better enhance the sense of immersion. In recent years, with the continuous development of near-eye display technology, near-eye display products using VR technology have gradually been widely used in fields such as film and television, education, and medical.

An optical system of conventional VR display products generally only has a single-piece lens. Due to imaging requirements of an optical path, a display screen is far away from the lens, resulting in a larger size of a VR display product, which is not conducive to the miniaturization of the device.

SUMMARY

Embodiments of the present invention provides a display device to improve technical problems in current VR near-eye display products that the display screen is far away from the lens due to imaging requirements of an optical path, thereby resulting in a larger size of VR near-eye display products.

In order to solve the above-mentioned technical problems, technical solutions provided by the application are as follows:

The present application provides a display device, comprising:
  a display screen;
  a first polarizer arranged on a light-emitting surface of the display screen;
  a light splitting sheet arranged on a side of the first polarizer away from the display screen, wherein a direction of a light transmission axis of the light splitting sheet is consistent with a direction of a light transmission axis of the first polarizer;
  a first quarter-wave plate arranged on a side of the light splitting sheet away from the first polarizer;
  a first lens arranged on a side of the first quarter-wave plate away from the light splitting sheet; and
  a transflective film arranged on a side of the first lens away from the first quarter-wave plate.

In the display device of the present application, the light splitting sheet is attached to a side surface of the side of the first polarizer away from the display screen, and the first quarter-wave plate is attached to a side surface of the side of the light splitting sheet away from the first polarizer.

In the display device of the present application, the light splitting sheet is attached to a side surface of the side of the first polarizer away from the display screen, and the first quarter-wave plate is attached to a side surface of a side of the first lens close to the display screen.

In the display device of the present application, the display device further comprises a second quarter-wave plate and a second polarizer, and the second quarter-wave plate is arranged on a side of transflective film away from the first lens, and the second polarizer is arranged on a side of the second quarter-wave plate away from the transflective film; and
  wherein a slow axis of the second quarter-wave plate is perpendicular to a slow axis of the first quarter-wave plate, and a light transmission axis of the second polarizer is perpendicular to the light transmission axis of the first polarizer.

In the display device of the present application, the display device further comprises a second lens arranged on a side of the first lens away from the display screen; and
  wherein the transflective film is disposed between the first lens and the second lens, and the second quarter-wave plate and the second polarizer are located a side of the second lens away from the first lens.

In the display device of the present application, the transflective film is attached to a side surface of the side of the first lens close to the second lens; and
  wherein the second quarter-wave plate is attached to the side surface of the second lens away from the first lens.

In the display device of the present application, the transflective film is attached to a side surface of the side of the second lens close to the side of the first lens; and
  wherein the first quarter-wave plate is attached to a side surface of the side of the first lens away from the second lens.

In the display device of the present application, the second polarizer is attached to a side surface of the side of the second quarter-wave plate away from the second lens; and
  wherein the light splitting sheet is attached to a side surface of the side of the first polarizer away from the display screen.

In the display device of the present application, the first lens has a first focal length, and a distance from the display screen to a center point of the first lens along a direction from the first lens to the display screen is less than or equal to the first focal length.

In the display device of the present application, the second lens has a second focal length; and
  wherein a distance from the center point of the first lens to a center point of the second lens is less than or equal to the first focal length or/and the second focal length.

In the present application, a first polarizer, a light splitting sheet, a first quarter-wave plate, a first lens and a transflective film are sequentially arranged on the light-emitting side of the display screen, so that the emitting light becomes first linearly polarized light after passing through the first polarizer. The first linearly polarized light is modulated into first circularly polarized light after passing through the light splitting sheet and the first quarter-wave plate and is incident on the first lens, and a part of the first circularly polarized light passes through the first lens and the transflective film, so that an human eye can observe a first virtual image on a backlight side of the display screen. Another part of the first circularly polarized light is reflected back by the transflective film to become second circularly polarized light, the second circularly polarized light is incident on the first quarter-wave plate and is modulated into the first linearly polarized light to incident on the light splitting sheet. After being reflected by the light splitting sheet, it becomes the second linearly polarized light and is incident on the first quarter-wave plate. The first quarter-wave plate modulates the second linearly polarized light into the second circularly polarized light and reflects it back to the first lens and the transflective film. The second circularly polarized light is transmitted through the first lens and the transflective film, so that the human eye can observe the second virtual image located on a backlight side of the display screen, and the second virtual image does not overlap with the first virtual image. In the present application, through the above settings, a part of the light emitted from the display screen can be reflected and refracted for multiple times between the first lens and the display screen, so that a light output path of the display screen 100 can be folded, which greatly increases an effective optical path of light propagation and can reduce a distance between the display screen and the first lens, thereby reducing a size of a VR near-eye display product and realizing the miniaturization of the product. Moreover, since the first virtual image and the second virtual image that do not overlap can be observed by the human eye, the present application can also realize an image display of two image planes, so that the human eye can see a 3D images with two depths of field, thereby enhancing a stereoscopic display sense.

BRIEF DESCRIPTION OF DRAWINGS

To detailly explain the technical schemes of the embodiments or existing techniques, drawings that are used to illustrate the embodiments or existing techniques are provided. Apparently, the illustrated embodiments are just a part of those of the present disclosure. It is easy for any person having ordinary skill in the art to obtain other drawings without labor for inventiveness.

DETAILED DESCRIPTION

Figure 1:
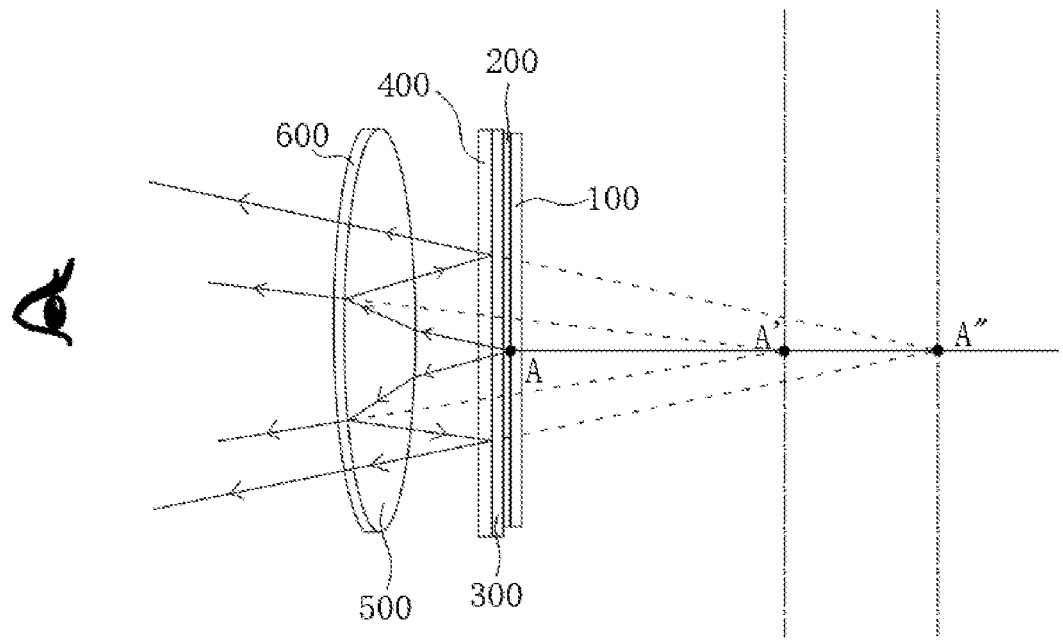
FIG. 1 is a first structural schematic diagram of a display device described in the present application.

Technical solutions in the embodiments of the present application will be clearly and completely described below with reference to the drawings in the embodiments of the present application. Obviously, the described embodiments are only a part of the embodiments of the present application, but not all of the embodiments. Based on the embodiments in the present application, all other embodiments obtained by those skilled in the art without creative work fall within the protection scope of the present application. In addition, it should be understood that the specific embodiments described herein are only used to illustrate and explain the present application, but not to limit the present application. In this application, unless otherwise stated, the directional words used such as "upper" and "lower" generally refer to the upper and lower sides of the device in actual use or working state, specifically the drawing direction in the accompanying drawings while "inside" and "outside" refer to the outline of the device.

Virtual reality (VR) technology is a way of enlarging and projecting virtual scenes, which can better enhance the sense of immersion. An optical system of conventional VR display products generally only has a single-piece lens. Due to imaging requirements of an optical path, a display screen is far away from the lens, resulting in a larger size of a VR display product, which is not conducive to the miniaturization of the device. The present application proposes following solutions based on the above technical problems.

Referring to FIGS. 1 to 7, the present application provides a display device comprising a display screen 100, a first polarizer 200 arranged on a light-emitting surface of the display screen 100, a light splitting sheet 300 arranged on a side of the first polarizer 200 away from the display screen 100, a first quarter-wave plate 400 arranged on a side of the light splitting sheet 300 away from the first polarizer 200, a first lens 500 arranged on a side of the first quarter-wave plate 400 away from the light splitting sheet 300 and a transflective film 600 arranged on a side of the first lens 500 away from the first quarter-wave plate 400. A direction of a light transmission axis of the light splitting sheet 300 is consistent with a direction of a light transmission axis of the first polarizer 200, and the first lens 500 and the display screen 100 are separately arranged.

In the present application, the first polarizer 200, the light splitting sheet 300, the first quarter-wave plate 400, the first lens 500 and the transflective film 600 are sequentially arranged on the light-emitting side of the display screen 100, so that the emitting light becomes first linearly polarized light after passing through the first polarizer 200. The first linearly polarized light is modulated into first circularly polarized light after passing through the light splitting sheet 300 and the first quarter-wave plate 400 and is incident on the first lens 500, and a part of the first circularly polarized light passes through the first lens 500 and the transflective film 600, so that an human eye can observe a first virtual image on a backlight side of the display screen 100. Another part of the first circularly polarized light is reflected back by the transflective film 600 to become second circularly polarized light, the second circularly polarized light is incident on the first quarter-wave plate 400 and is modulated into the first linearly polarized light to incident on the light splitting sheet. After being reflected by the light splitting sheet 300, it becomes the second linearly polarized light and is incident on the first quarter-wave plate 400. The first quarter-wave plate 400 modulates the second linearly polarized light into the second circularly polarized light and reflects it back to the first lens 500 and the transflective film 600. The second circularly polarized light is transmitted through the first lens 500 and the transflective film 600, so that the human eye can observe the second virtual image located on a backlight side of the display screen 100, and the second virtual image does not overlap with the first virtual image.

In the present application, through the above settings, a part of the light emitted from the display screen 100 can be reflected and refracted for multiple times between the first lens 500 and the display screen 100, so that a light output path of the display screen 100 can be folded, which greatly increases an effective optical path of light propagation and can reduce a distance between the display screen 100 and the first lens 500, thereby reducing a size of a VR near-eye display product and realizing the miniaturization of the product. Moreover, since the first virtual image and the second virtual image that do not overlap can be observed by the human eye, the present application can also realize an image display of two image planes, so that the human eye can see a 3D images with two depths of field, thereby enhancing a stereoscopic display sense.

Technical solutions of the present application will now be described with reference to specific embodiments. It should be noted that the description order of the following embodiments is not intended to limit the preferred order of the embodiments.

In this embodiment, the display screen 100 may be a liquid crystal display screen, an LED display screen, a mini-LED display screen, a micro-LED display screen, an OLED display screen, or the like.

In this embodiment, the first polarizer 200 is a linear polarizer, and a direction of the light transmission axis of the light splitting sheet 300 is consistent with a direction of the light transmission axis of the first polarizer 200. It can be understood that the polarized light having the same vibration direction can pass through the light splitting sheet 300 and the first polarizer 200.

In this embodiment, the first quarter-wave plate 400 can modulate linearly polarized light into circularly polarized light, and can modulate circularly polarized light into linearly polarized light.

In this embodiment, the first lens 500 may be a convex lens or a concave lens, a material of the first lens 500 may be glass or plastic material, and a type of the first lens 500 may be a common lens, a micro lens array, a Fresnel lens, a liquid crystal lens, and other holographic elements that can realize the imaging function of lenses.

In this embodiment, the transflective film 600 can reflect and transmit the incident light, that is, part of the light is reflected back and part of the light passes through when the incident light passes through the transflective film 600, and the transflective film 600 can be embodied as a coating film or a coating film.

Referring to FIG. 1, in the display device of the present application, the light splitting sheet 300 can be arranged on a side surface of a side of the first polarizer 200 away from the display screen 100. That is, the light splitting sheet 300 can be attached to the first polarizer 200 on the display screen 100, or the light splitting sheet 300 may be arranged on the first polarizer 200 by coating, film-coating, or the like.

In this embodiment, the first quarter-wave plate 400 may be arranged on a side surface of a side of the light splitting sheet 300 away from the first polarizer 200. That is, the first quarter-wave plate 400 may be attached to a side surface of the light splitting sheet 300, or the first quarter-wave plate 400 may be arranged on the light splitting sheet 300 by coating, film-coating, or the like.

In this embodiment, the first quarter-wave plate 400 and the first lens 500 may be separately arranged. In this case, the display screen 100, the first polarizer 200, the light splitting sheet 300 and the first quarter-wave plate 400 can be combined as an assembly, and there is a gap between the combined assembly and the first lens 500, so that the light emitted from the display screen 100 can be fully refracted by the first lens 500 to improve imaging quality.

Figure 2:
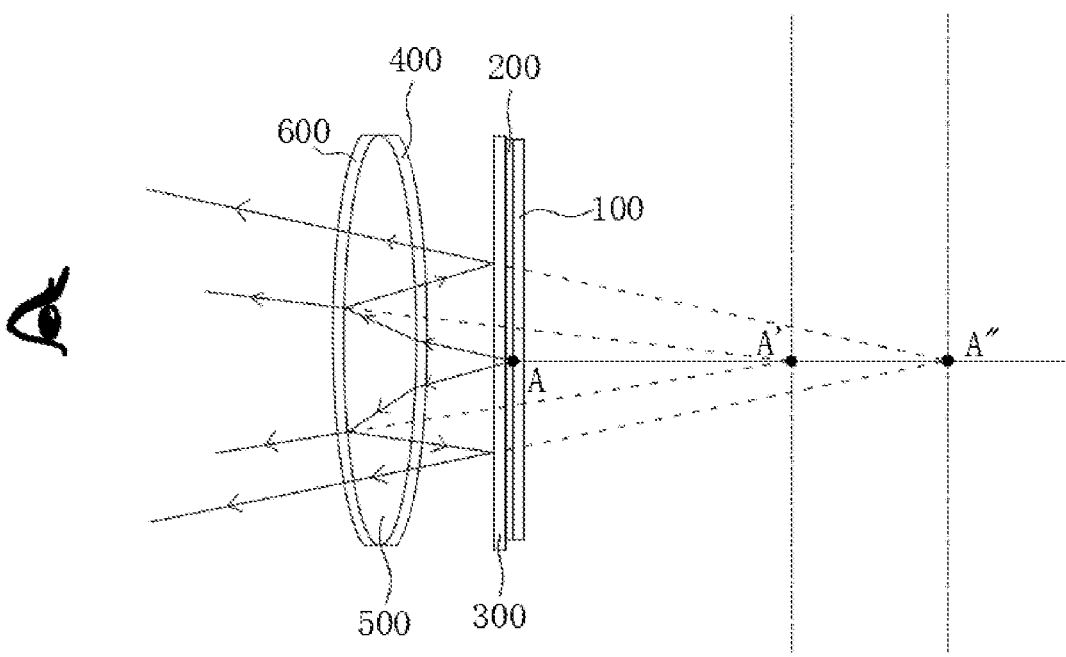
FIG. 2 is a second structural schematic diagram of a display device described in the present application.

Referring to FIG. 2, in the display device of the present application, the light splitting sheet 300 can be arranged on a side surface of a side of the first polarizer 200 away from the display screen 100. That is, the light splitting sheet 300 can be attached to the first polarizer 200 on the display screen 100, or the light splitting sheet 300 may be formed on the first polarizer 200 by coating, film-coating, or the like.

In this embodiment, the first quarter-wave plate 400 may be arranged on a side surface of a side of the first lens 500 close to the display screen 100. That is, the first quarter-wave plate 400 may be attached to the first lens 500, or the first quarter-wave plate 400 may be formed on the first lens 500 by coating, film-coating, or the like.

In this embodiment, the light splitting sheet 300 and the first quarter-wave plate 400 can be separated arranged. In this case, the display screen 100, the first polarizer 200 and the light splitting sheet 300 are combined as an assembly, the first quarter-wave plate 400 and the first lens 500 are combined as an assembly, and there is a gap between the combined assembly of the display screen 100, the first polarizer 200 and the light splitting sheet 300 and the combined assembly of the first quarter-wave plate 400 and the first lens 500, so that the light emitted from the display screen 100 can be fully refracted by the first lens 500, thereby improving the imaging quality.

Figure 3:
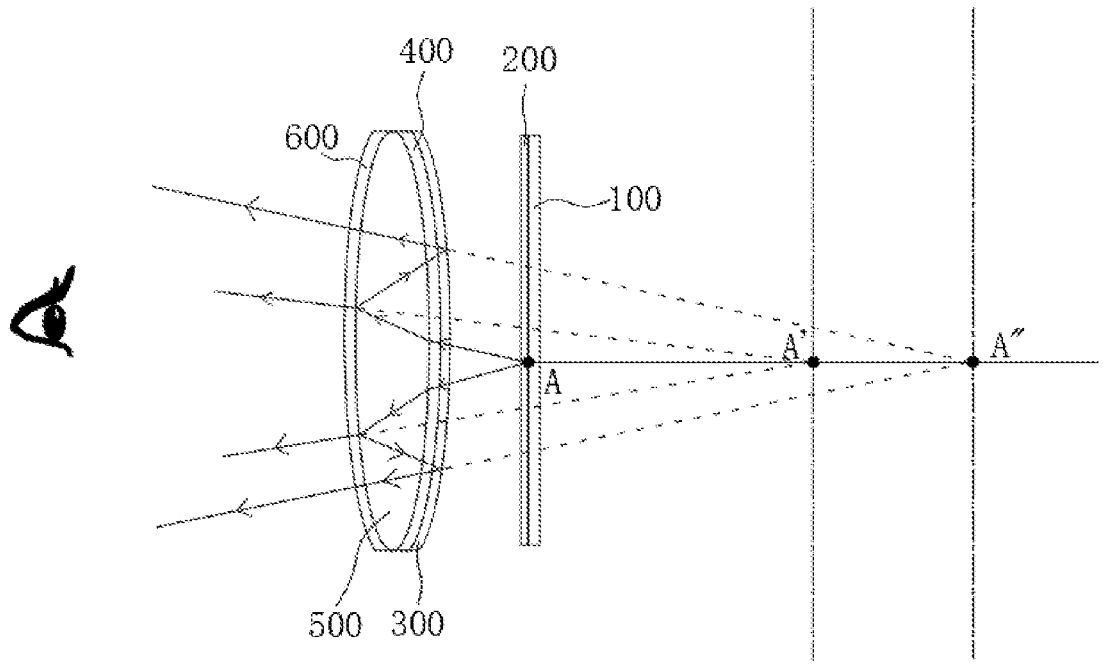
FIG. 3 is a third structural schematic diagram of a display device described in the present application.

Please refer to FIG. 3, in the display device of the present application, the first quarter-wave plate 400 may be arranged on a side surface of a side of the first lens 500 close to the display screen 100. That is, the first quarter-wave plate 400 may be attached to a surface of the first lens 500, or the first quarter-wave plate 400 may be formed on the first lens 500 by coating, film-coating, or the like.

In this embodiment, the light splitting sheet 300 may be arranged on a side surface of a side of the first quarter-wave plate 400 away from the first lens 500. That is, the light splitting sheet 300 may be attached to the first quarter-wave plate 400, or the light splitting sheet 300 may be formed on the first quarter-wave plate 400 by coating, film-coating, or the like.

In this embodiment, the light splitting sheet 300 and the first polarizer 200 can be separately arranged. In this case, the display screen 100 and the first polarizer 200 are combined as an assembly, and the light splitting sheet 300, the first quarter-wave plate 400 and the first lens 500 are combined as an assembly, and there is a gap between the combined assembly of the display screen 100 and the first polarizer 200 and the combined assembly of the quarter-wave plate 400 and the first lens 500, so that the light emitted from the display screen 100 can be fully refracted by the first lens 500, thereby improving the imaging quality.

Figure 4:
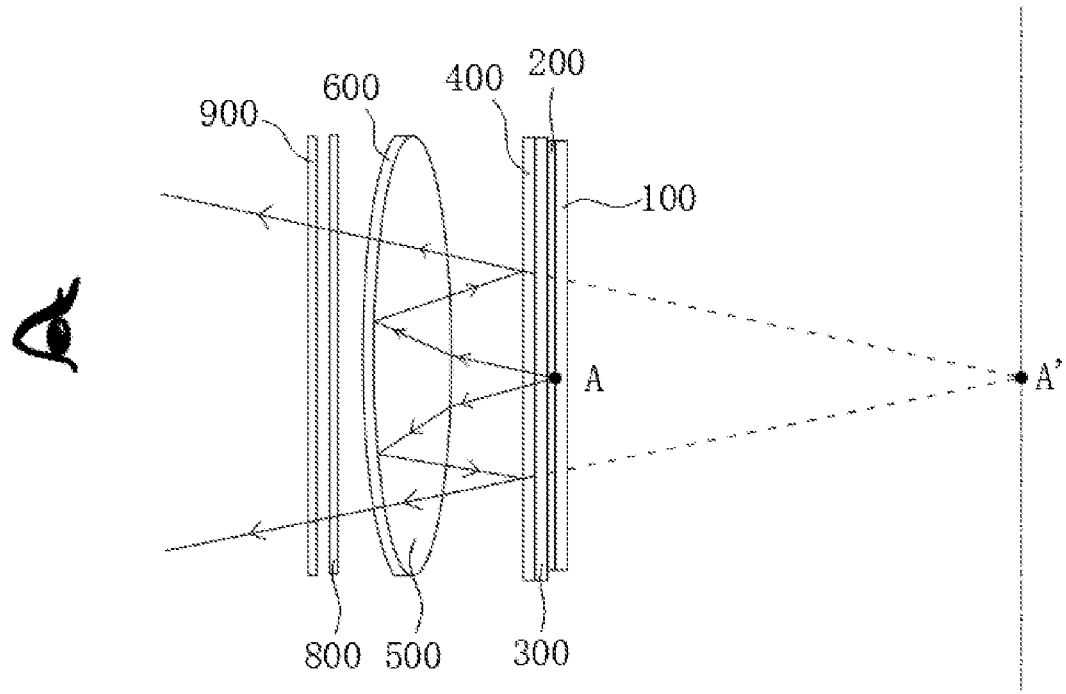
FIG. 4 is a fourth structural schematic diagram of a display device described in the present application.
Figure 5:
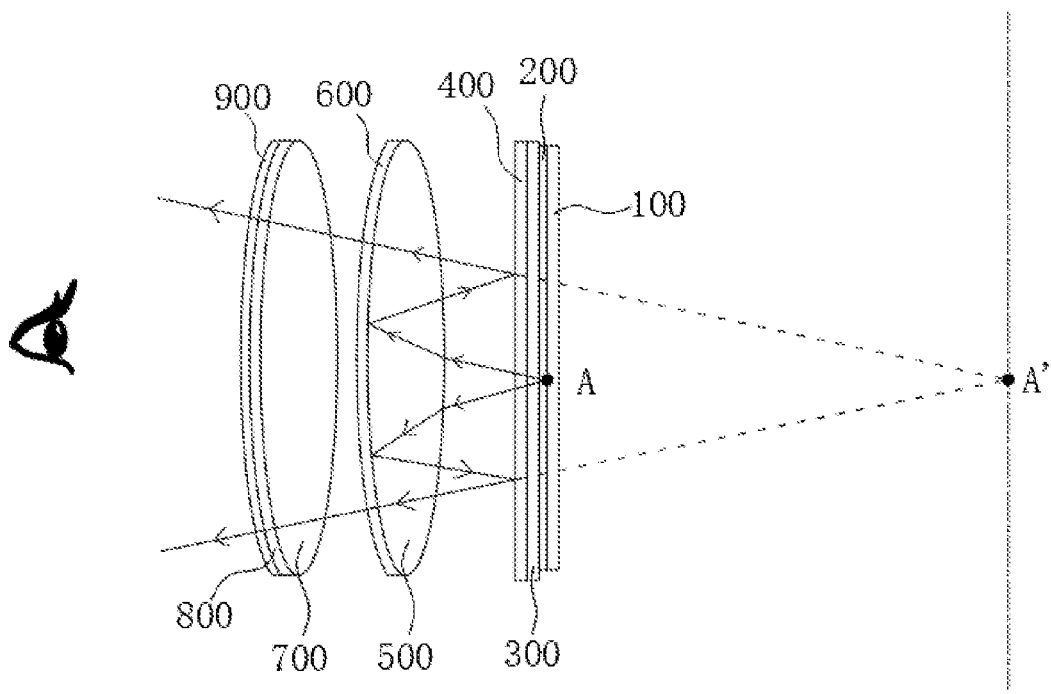
FIG. 5 is a fifth structural schematic diagram of a display device described in the present application.
Figure 6:
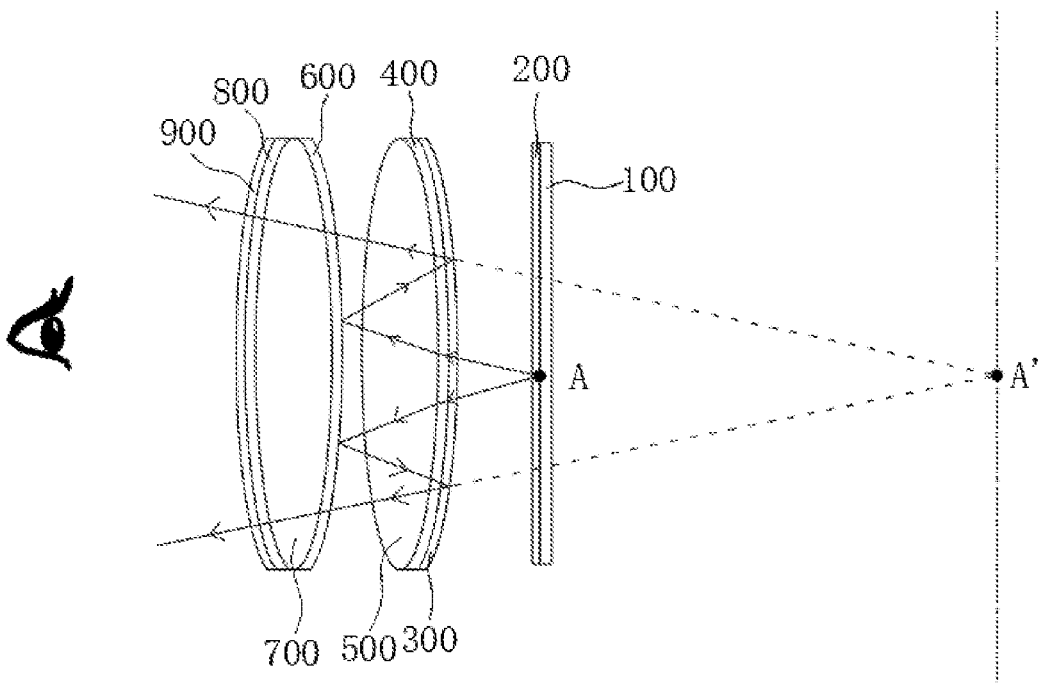
FIG. 6 is a sixth structural schematic diagram of a display device described in the present application.

Referring to FIGS. 4 to 6, in the display device of the present application, the display device may further include a second quarter-wave plate 800 and a second polarizer 900. The second quarter-wave plate 800 is arranged on a side of the transflective film 600 away from the first lens 500, and the second polarizer 900 is arranged on a side of the second quarter-wave plate 800 away from the transflective film 600. A slow axis of the second quarter-wave plate 800 is perpendicular to a slow axis of the first quarter-wave plate 400, and a light transmission axis of the second polarizer 900 is perpendicular to a light transmission axis of the first polarizer 200.

Referring to FIG. 4, in this embodiment, the light emitted from the display screen 100 becomes first linearly polarized light after passing through the first polarizer 200, and the first linearly polarized light is then modulated into a first circularly polarized light after passing through the light splitting sheet 300 and the quarter-wave plate 400 to incident on the first lens 500. A part of the first circularly polarized light passes through the first lens 500 and the transflective film 600, and the other part of the circularly polarized light is reflected back by the transflective film 600 to become a second circularly polarized light.

The first circularly polarized light passing through the first lens 500 and the transflective film 600 is modulated into the first linearly polarized light after passing through the second quarter-wave plate 800. A transmission axis of the first polarizer 200 is perpendicular to a transmission axis of the first polarizer 200, so the first linearly polarized light will be absorbed after entering the second polarizer 900 and fails to enter the human eye for imaging.

The other part of the first circularly polarized light reflected by the transflective film 600 becomes the second circularly polarized light. The second circularly polarized light emitted on the first quarter-wave plate 400 is modulated as the first linearly polarized light to incident on the light splitting sheet 300 and becomes the second linearly polarized light to incident on the first quarter-wave plate 400 after being reflected by the light splitting sheet 300. The first quarter-wave plate 400 modulates the second linearly polarized light into a second circularly polarized light and reflects it back to the first lens 500 and the transflective film 600, and the second circularly polarized light passes through the second quarter-wave plate 800 after passing through the first lens 500 and the transflective film 600 and becomes the second linearly polarized light. Since the transmission axis of the second polarizer 900 is perpendicular to the transmission axis of the first polarizer 200, the second linearly polarized light can pass through the second polarizer 900 and enter the human eye for imaging.

In this embodiment, the second quarter-wave plate 800 and the second polarizer 900 are sequentially arranged on the side of the first lens 500 away from the display screen 100, so that a part of the emitted light of the display screen 100 becomes the first linearly polarized light after passing through the first lens 500 and the transflective film 600, which is absorbed by the second polarizer 900 and cannot enter the human eye for imaging. The other part of the emitted light of the assembly display screen 100 reflected by the transflective film 600 finally becomes the second linearly polarized light and passes through the second polarizer 900 after multiple refraction and reflection between the first quarter-wave plate 400, the light splitting sheet 300, the transflective film 600 and the second quarter-wave plate 800, so that the human eye can see a virtual image formed by passing the first circularly polarized light through the first lens 500 which was previously reflected by the transflective film 600.

Through the above-mentioned settings in this embodiment, the light emitting path of the display screen 100 can also be folded, which greatly increases an effective optical path of light propagation, thereby reducing a distance between the display screen 100 and the first lens 500, thereby reducing The size of the VT near-eye displaying product to realize the miniaturization of the product.

It should be noted that the virtual image viewed by the human eye in this embodiment is different from the first virtual image and the second virtual image described in other embodiments. The main difference is that in this embodiment, the human eye can only see one virtual image. The virtual image is formed by the last emitted second linearly polarized light, while in other embodiments, the human eye can see two non-overlapping virtual images, and the two virtual images are formed by the last emitted second circularly polarized light. Compared with other embodiments, although there is only one imaging plane and a 3D display cannot be realized in this embodiment, the imaging is clearer and the visual experience is better.

Referring to FIG. 5 and FIG. 6, in the display device of the present application, the display device may further include a second lens 700 arranged on a side of the first lens 500 away from the display screen 100. The second lens 700 can also be a convex lens or a concave lens, a material of the second lens 700 can be glass or plastic material, and its type can be a common lens, a micro lens array, a Fresnel lens, a liquid crystal lens, and other lenses that can be realized imaging function of holographic elements, or the like.

In this embodiment, the transflective film 600 may be disposed between the first lens 500 and the second lens 700, so that the second lens 700 can condense the light passing through the transflective film 600 to increase an amount of light entering the human eye and a brightness of the light emitted, and improve a visual experience of the human eye.

In this embodiment, the second quarter-wave plate 800 and the second polarizer 900 may be located on the side of the second lens 700 away from the first lens 500, so that the second lens 700 can condense more light incident to the second quarter-wave plate 800 and the second polarizer 900, thereby increasing the light output modulated by the second quarter-wave plate 800 and increasing the amount of light entering people. The light output and brightness of the eye can improve the visual experience of the human eye.

Please refer to FIG. 5, in the display device of the present application, the transflective film 600 may be arranged on a side surface of the side of the first lens 500 close to the second lens 700. At this time, the transflective film 600 may be attached to the surface of the first lens 500 on the side away from the display screen 100, or the transflective film 600 may be formed on the first lens 500 by coating, film-coating or the like.

In this embodiment, a main light transmittance axis of the first lens 500 and the main light transmittance axis of the second lens 700 are arranged to coincide, and the first lens 500 and the second lens 700 are disposed separately along a direction of the main light transmittance of the first lens 500 or the second lens 700. In other words, there is a gap between the first lens 500 and the second lens 700 along the direction of their main light transmittance axes.

In this embodiment, since the transflective film 600 is arranged on the surface of the first lens 500, the transflective film 600 and the second lens 700 are also arranged separately.

In this embodiment, by arranged the transflective film 600 on the side of the first lens 500 close to the second lens 700, the first lens 500 plays a rigid supporting role to the transflective film 600, and the transflective film 600 is not prone to wrinkles or cracks, so as to stably refract or reflect the light passing through the first lens 500 and improve the final imaging quality.

Referring to FIG. 6, in the display device of the present application, the transflective film 600 may be arranged on a side surface of the side of the second lens 700 close to the first lens 500. At this time, the transflective film 600 may be attached to the surface of the second lens 700 on the side close to the first lens 500, or the transflective film 600 may be formed on the surface of the second lens 700 by coating, film-coating or the like.

In this embodiment, the main light transmittance axis of the first lens 500 and the main light transmittance axis of the second lens 700 are arranged to coincide, and the first lens 500 or the second lens 700 are arrange separately along the light transmittance axis of the first lens 500 or the second lens 700. In other words, there is a gap between the first lens 500 and the second lens 700 along the direction of their main light transmittance axis.

In this embodiment, since the transflective film 600 is arranged on the surface of the second lens 700, the transflective film 600 and the first lens 500 are also arranged separately.

In this embodiment, by disposing the transflective film 600 on the surface of the second lens 700 close to the first lens 500, the second lens 700 plays a rigid supporting role to the transflective film 600, and the transflective film 600 is not prone to wrinkles or cracks, so as to stably refract or reflect the light passing through the first lens 500 and improve the final imaging quality.

Please refer to FIG. 5 and FIG. 6, in the display device of the present application, the second quarter-wave plate 800 may be arranged on a side surface of the side of the second lens 700 away from the first lens 500. In this case, the second quarter-wave plate 800 can be attached to the surface of the second lens 700 on the side away from the first lens 500, or the second quarter-wave plate 800 can be formed on the second lens 700 by coating, film-coating, or the like.

In this embodiment, the second polarizer 900 may be arranged on a side surface of the side of the second quarter-wave plate 800 away from the second lens 700. In this case, the second polarizer 900 may be attached to the surface on the side away from the second lens 700. Alternatively, the second polarizer 900 can be formed on the second quarter-wave plate 800 by coating, film-coating, or the like.

In this embodiment, the second quarter-wave plate 800 is arranged on the surface of the second lens 700 away from the first lens 500, and the second polarizer 900 is arranged on the surface of the second quarter-wave plate 800 away from the second lens 700, the second lens 700 can rigidly support the second quarter-wave plate 800 and the second polarizer 900. The second quarter-wave plate 800 and the second polarizer 900 are not prone to wrinkles or cracks, so as to stably refract the light passing through the second lens 700 and improve the final image quality.

Figure 7:
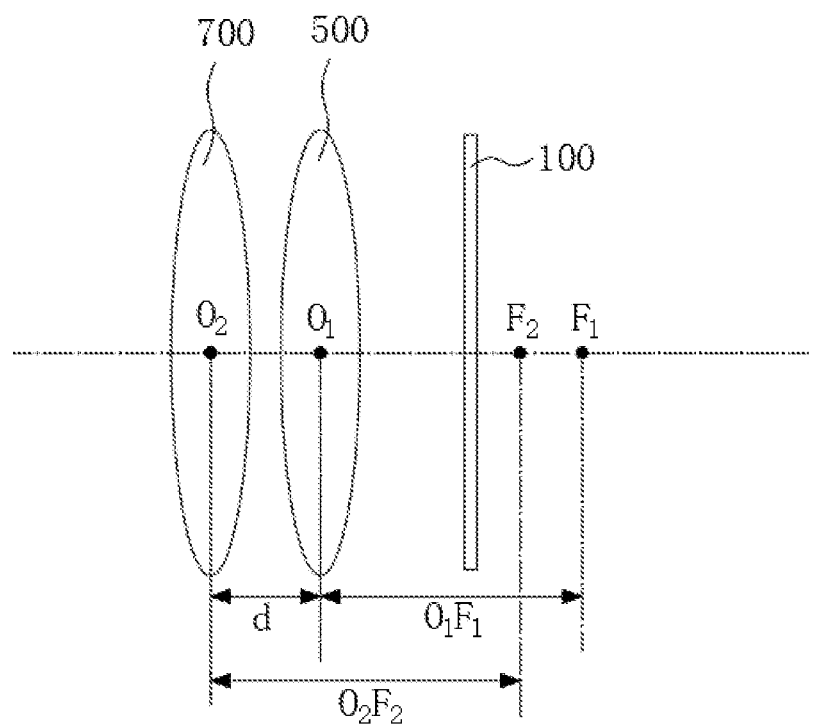
FIG. 7 is a schematic diagram of relative positions of a first lens, a second lens and a display screen according to the present application.

Referring to FIG. 7, in the display device of the present application, the first lens 500 has a first focal length O1F1, and a connection line of between the center point O1 of the first lens 500 and the center point O2 of the second lens 700 is parallel to a direction from the first lens 500 to the second lens 700.

In this embodiment, the connection line of the center point O1 of the first lens 500 and the center point O2 of the second lens 700 is parallel to the main light transmittance axis of the first lens 500 or/and the second lens 700. That is, the direction from the first lens 500 to the second lens 700 is parallel to the main light transmittance axis of the first lens 500 or/and the second lens 700.

In this embodiment, a distance d from the center point O1 of the first lens 500 to the center point O2 of the second lens 700 may be smaller than or equal to the first focal length O1F1 or/and the second focal length O2F2, so as to optimize the distance between the first lens 500 and the second lens 700. The light passing through the first lens 500 can be efficiently condensed by the second lens 700, so as to increase the light output that finally reaches the human eye, and improve the visual experience of the final virtual image viewed by the human eye.

In the embodiment of the present application, by sequentially arranging the first polarizer 200, the light splitting sheet 300, the first quarter-wave plate 400, the first lens 500, the transflective film 600, the second quarter-wave plate 800 and the second polarizer 900 on the light-emitting side of the display screen 100, the light emitted from the display screen 100 undergoes multiple reflections and refractions are performed between the light splitting sheet 300, the first quarter-wave plate 400, the first lens 500, the transflective film 600, and the second quarter-wave plate 800 and finally becomes the second linearly polarized light and passes through the second polarizer 900, so that it can enter the human eye for imaging. This stacking structure can realize the folding of the light emitting path of the display screen 100, greatly increase the effective optical path of light propagation, thereby reducing a gap between the display screen 100 and the first lens 500, thereby reducing the size of the VR near-eye display product and achieve miniaturization of the product.

The display device provided by the embodiments of the present invention is described in detail above. While the present disclosure has been described with the aforementioned preferred embodiments, it is preferable that the above embodiments should not be construed as limiting of the present disclosure. Anyone having ordinary skill in the art can make a variety of modifications and variations without departing from the spirit and scope of the present disclosure as defined by the following claims.

What is claimed is:

1. A display device, comprising:
   a display screen;
   a first polarizer arranged on a light-emitting surface of the display screen;
   a light splitting sheet arranged on a side of the first polarizer away from the display screen, wherein a direction of a light transmission axis of the light splitting sheet is consistent with a direction of a light transmission axis of the first polarizer;
   a first quarter-wave plate arranged on a side of the light splitting sheet away from the first polarizer;
   a first lens arranged on a side of the first quarter-wave plate away from the light splitting sheet; and
   a transflective film arranged on a side of the first lens away from the first quarter-wave plate;
   wherein the display device further comprises a second quarter-wave plate arranged on a side of transflective film away from the first lens.

2. The display device according to claim 1, wherein the light splitting sheet is attached to a side surface of the side of the first polarizer away from the display screen, and the first quarter-wave plate is attached to a side surface of the side of the light splitting sheet away from the first polarizer.

3. The display device according to claim 1, wherein the light splitting sheet is attached to a side surface of the side of the first polarizer away from the display screen, and the first quarter-wave plate is attached to a side surface of a side of the first lens close to the display screen.

4. The display device according to claim 1, wherein the display device further comprises a second polarizer arranged on a side of the second quarter-wave plate away from the transflective film; and
   wherein a slow axis of the second quarter-wave plate is perpendicular to a slow axis of the first quarter-wave plate, and a light transmission axis of the second polarizer is perpendicular to the light transmission axis of the first polarizer.

5. The display device according to claim 4, wherein the display device further comprises a second lens arranged on a side of the first lens away from the display screen; and
   wherein the transflective film is disposed between the first lens and the second lens, and the second quarter-wave plate and the second polarizer are located a side of the second lens away from the first lens.

6. The display device according to claim 5, wherein the transflective film is attached to the side surface of the first lens close to the second lens; and
   wherein the second quarter-wave plate is attached to a side surface of the side surface of the second lens away from the first lens.

7. The display device according to claim 5, wherein the transflective film is attached to the side surface of the second lens close to the side of the first lens; and
   wherein the first quarter-wave plate is attached to a side surface of the side of the first lens away from the second lens.

8. The display device according to claim 5, wherein the second polarizer is attached to the side of the second quarter-wave plate away from the second lens; and wherein the light splitting sheet is attached to a side surface of the side of the first polarizer away from the display screen.

9. The display device according to claim 5, wherein the first lens has a first focal length, and a distance from the display screen to a center point of the first lens along a direction from the first lens to the display screen is less than or equal to the first focal length.

10. The display device according to claim 9, wherein the second lens has a second focal length; and
wherein a distance from the center point of the first lens to a center point of the second lens is less than or equal to the first focal length or/and the second focal length.

11. A display device, comprising:
a display screen;
a first polarizer arranged on a light-emitting surface of the display screen;
a light splitting sheet arranged on a side of the first polarizer away from the display screen, wherein a direction of a light transmission axis of the light splitting sheet is consistent with a direction of a light transmission axis of the first polarizer;
a first quarter-wave plate arranged on a side of the light splitting sheet away from the first polarizer;
a first lens arranged on a side of the first quarter-wave plate away from the light splitting sheet; and
a transflective film arranged on a side of the first lens away from the first quarter-wave plate;
wherein the light splitting sheet is attached to a side surface of the side of the first polarizer away from the display screen, and the first quarter-wave plate is attached to a side surface of the side of the light splitting sheet away from the first polarizer;
wherein the display device further comprises a second quarter-wave plate and a second polarizer, and the second quarter-wave plate is arranged on a side of transflective film away from the first lens, and the second polarizer is arranged on a side of the second quarter-wave plate away from the transflective film; and
wherein a slow axis of the second quarter-wave plate is perpendicular to a slow axis of the first quarter-wave plate, and a light transmission axis of the second polarizer is perpendicular to the light transmission axis of the first polarizer.

12. The display device according to claim 11, wherein the display device further comprises a second lens arranged on a side of the first lens away from the display screen; and
wherein the transflective film is disposed between the first lens and the second lens, and the second quarter-wave plate and the second polarizer are located a side of the second lens away from the first lens.

13. The display device according to claim 12, wherein the transflective film is attached to the side surface of the first lens close to the second lens; and
wherein the second quarter-wave plate is attached to a side surface of the side surface of the second lens away from the first lens.

14. The display device according to claim 12, wherein the transflective film is attached to the side surface of the second lens close to the side of the first lens; and
wherein the first quarter-wave plate is attached to a side surface of the side of the first lens away from the second lens.

15. The display device according to claim 12, wherein the second polarizer is attached to the side of the second quarter-wave plate away from the second lens; and
wherein the light splitting sheet is attached to a side surface of the side of the first polarizer away from the display screen.

16. The display device according to claim 12, wherein the first lens has a first focal length, and a distance from the display screen to a center point of the first lens along a direction from the first lens to the display screen is less than or equal to the first focal length.

17. The display device according to claim 16, wherein the second lens has a second focal length; and
wherein a distance from the center point of the first lens to a center point of the second lens is less than or equal to the first focal length or/and the second focal length.

* * * * *